United States Patent Office 3,041,332
Patented June 26, 1962

3,041,332
PHENYLCYCLOPROPYLCARBOXYAMIDO DERIVATIVES OF PENICILLANIC ACID
Alfred W. Chow, Merchantville, N.J., and John R. E. Hoover, Glenside, Pa., assignors to Smith Kline & French Laboratories, Philadelphia, Pa., a corporation of Pennsylvania
No Drawing. Filed May 11, 1960, Ser. No. 28,221
8 Claims. (Cl. 260—239.1)

This invention relates to novel chemotherapeutic agents and to processes for their preparation. More specifically it pertains to valuable synthetic antibiotics which not only possess valuable antimicrobial activity, but also demonstrate improved physical and physiological properties.

In general the novel compounds of our invention may be represented by the following structural formula:

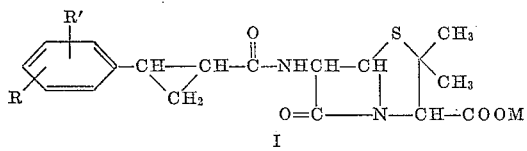

I wherein R and R' represent hydrogen, halogen, lower alkoxy, lower alkyl, halogenated lower alkoxy, halogenated lower alkyl, amino, nitro and hydroxy; and M represents hydrogen or a pharmaceutically acceptable cation.

Representative of the groups embraced by the symbol R and R' are, in addition to hydrogen, halogen such as chloro, bromo, fluoro, and iodo; lower alkyl such as methyl, ethyl, propyl, t-butyl and the like; lower alkoxy such as methoxy, ethoxy, isopropoxy, butoxy and the like; halogenated lower alkyl such as chloroethyl, trifluoromethyl and the like; halogenated lower alkoxy such as chloroethoxy and trifluoromethoxy; amino, including mono-lower alkyl amine, e.g. methylamino, di-lower alkylamino, e.g. dimethylamine, and the unsubstituted amino group; nitro and hydroxy. The groups represented by R and R' may be the same or different.

The group M embraces hydrogen; i.e., the carboxylic acid function is present as the free acid, or pharmaceutically acceptable cations such as sodium ion, potassium ion or ammonium ion.

It is apparent from the above that our novel compounds are 6-phenylcyclopropanecarboxyamido derivatives of penicillanic acid and their pharmaceutically acceptable basic salts. We have found the compounds possessing the structure of Formula I demonstrate antimicrobial activity similar to that demonstrated by the naturally occurring penicillins and in addition, possess improved physical and physiological properties. These properties render this new class of compounds as a group of valuable thereapeutic agents in the treatment of various microbial infections. Surprisingly, while these compounds retain the beneficial antimicrobial properties of the naturally occurring penicillins and demonstrated improved physical and physiological properties, undesirable side effects are considerably reduced or completely absent.

The compounds of our invention are prepared by treating appropriately substituted 2-phenylcyclopropanecarboxylic acid with a lower alkyl chloroformate such as, for example, ethyl chloroformate, so as to form the corresponding mixed anhydride. Subsequent treatment of this mixed anhydride with 6-aminopenicillanic acid then yields the correspondingly substituted 6-(2-phenylcyclopropanecarboxyamido) - penicillanic acid. These reactions may be summarized as follows:

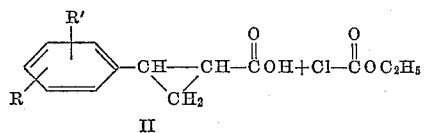 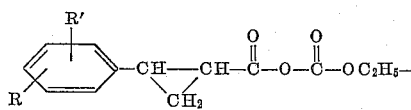 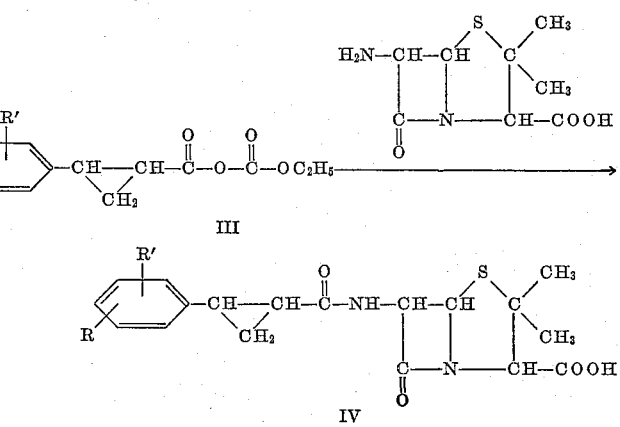

IV wherein R and R' are as above defined.

Alternatively 6-aminopenicillanic acid is treated with a 2-phenylcyclopropanecarboxyl chloride and there is thus obtained the corresponding compound of Formula IV.

Several of the starting materials having a structure according to Formula II are readily available. Those compounds which are unknown may be readily prepared by methods described in the literature and known to the art. Thus for example, a substituted styrene is treated with ether diazoacetate and there is thus obtained the correspondingly substituted phenylcyclopropane ethyl carboxylate which upon basic hydrolysis yields the desired acid. These reactions are represented as follows:

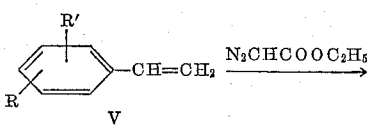

V

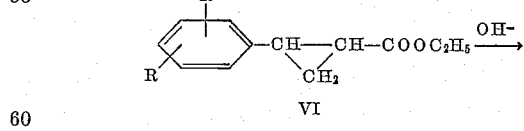

VI

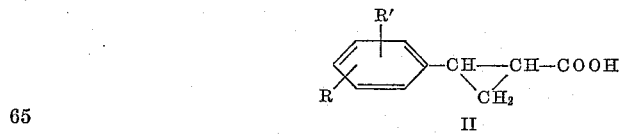

II

Where either or both of the groups R and R' represent amino, this group may be initially present in the starting material or may be formed by reduction of a nitro group subsequent to the formation of the penicillanic acid derivatives. Where it is necessary to execute particularly vigorous reaction procedures, the amino group may be protected by methods well known and widely used in the art, as for example acylation.

Also included within the scope of this invention are the non-toxic salts of our compounds, as for example, the sodium, potassium or ammonium salts. These salts may be prepared by methods well known to the art.

It can be readily seen from nature of our novel compounds that the configuration about the cyclopropane group may be either cis or trans. In the formation of this cyclopropane ring via the diazoacetate reaction, both forms are advantageously formed and may be separated by fractional distillation of the resultant phenylcyclopropanecarboxylate or alternatively by fractional recrystallization of the subsequently formed free acid. The penicillanic acid derivatives of both the cis and trans forms demonstrate activity and both forms are embraced with the scope of this invention.

As discussed above, these compounds possess valuable antimicrobial properties and may be administered by any of the known pharmaceutical forms, as for example, in forms of tablets and capsules for oral administration, creams and ointments for topical application, or solutions and suspensions for injectable or various topical applications.

The following examples will serve to further typify our invention. These examples however should not be construed as limiting the scope of this invention, the scope being defined only by the appended claims.

Example 1

A solution of 13.9 g. (0.086 M) of 2-phenylcyclopropanecarboxylic acid in 200 ml. of acetone is cooled in an ice-salt bath to 0° C. To the cooled solution is added 10.2 g. (0.1 M) of triethylamine in 100 ml. of acetone. The temperature of the reaction mixture is maintained at 0° C. and a solution of 12.5 g. (0.11 M) of ethyl chloroformate in 45 ml. of acetone is added in a dropwise fashion with agitation. The resultant mixture is stirred for 30 minutes and allowed to gradually reach room temperature after which time is filtered. The filtrate thus obtained is added slowly to a stirred solution 23.8 g. (0.1 M) of 6-aminopenicillanic acid in 900 ml. of 3% aqueous sodium bicarbonate solution and 500 ml. of acetone. Upon completion of the addition, the mixture is allowed to attain room temperature while stirring is continued and the solution then stirred for an additional one-half hour. The mixture is then extracted with three portions of 300 ml. of ether and the resulting aqueous solution adjusted to pH 2.0 with 6 N sulfuric acid while maintaining a temperature of less than 10° C. Upon reaching pH 2.5, the solution is extracted immediately with 250 ml. of butyl acetate followed by two additional extractions of 75 ml. each of butyl acetate.

To the combined butyl acetate extracts are added 250 ml. of water and the pH adjusted to 8.0 by the addition of solid potassium bicarbonate with agitation. The layers are separated and the aqueous layer is adjusted to pH 2.0 by the addition of 6 N sulfuric acid at less than 10° C. This acidic aqueous mixture is next extracted with 200 ml. of butyl acetate and this organic extract then washed once with water and dried over sodium sulfate. To the butyl acetate solution is added with vigorous stirring a solution of potassium hydroxide in n-butanol (40 g./l.) until the pH of the reaction mixture is 8.4. The mixture is placed in the refrigerator until crystallization occurs. The crystals are then collected by centrifugation, washed with a small amount of acetone and dried. The dried crystals are recrystallized from butanol and dried to yield 6-(2-phenylcyclopropanecarboxyamido)-penicillanic acid as the potassium salt.

Treatment of the potassium salt with hydrogen chloride and extraction with ether then yields the free acid, 6-(2-phenylcyclopropanecarboxyamido)-penicillanic acid.

Example 2

By substituting 17.4 g. of 2-(4-chlorophenyl)-cyclopropanecarboxylic acid in Example 1 and following the procedure therein described, there is obtained upon purification in the prescribed manner, 6-[2-(4-chlorophenyl)-cyclopropanecarboxyamido]-penicillanic acid.

In a similar fashion use of 2-(3-chlorophenyl)-cyclopropanecarboxylic acid yields the corresponding penicillanic acid derivatives, namely 6-[2-(3-chlorophenyl)-cyclopropanecarboxyamido]-penicillanic acid.

Example 3

2-(3-nitrophenyl)-cyclopropanecarboxylic acid (19.2 g.) is reacted according to the procedure of Example 1. Upon purification in the manner therein recited there is obtained 6-[2-(3-nitrophenyl)-cyclopropanecarboxyamido]-penicillanic acid.

Likewise, by employing 2-(4-nitrophenyl)-cyclopropanecarboxylic acid there is obtained the corresponding product 6 - [2 - (4 - nitrophenyl) - cyclopropanecarboxyamido]-penicillanic acid.

Example 4

Five grams of potassium 6-[2-(4-nitrophenyl)-cyclopropanecarboxyamido]-penicillanic acid are placed in a stainless steel hydrogenation container. There are then introduced 2.5 g. of 5% palladium on carbon in 18 ml. of water followed by 128 ml. of isopropanol under nitrogen. The container is flushed with nitrogen and hydrogen is then introduced at an initial pressure of about 30 lb./in.$^2$. The reaction is agitated for eight hours maintaining a temperature of approximately 25° C. by means of a water bath. At the end of this time, the container is flushed with nitrogen and 160 ml. of isopropanol are added. The resultant mixture is filtered and stored at 5° C. overnight. The solution is again filtered and filtrate reduced to a volume of approximately 60 ml. in vacuo. The solution is allowed to stand until crystals form. The solution is then filtered and the crystals so collected dried at 100° C. in vacuo. Recrystallization from isobutanol then yields potassium 6-[2-(4-aminophenyl)-cyclopropanecarboxyamido]-penicillanic acid.

Example 5

Sixteen grams of 2-(4-methylphenyl)-cyclopropanecarboxylic acid are substituted for 2-phenylcyclopropanecarboxylic acid in the procedure of Example 1 and there is thus obtained upon completion of the steps therein described, 6 - [2 - (4 - methylphenyl) - cyclopropanecarboxyamido]-penicillanic acid.

Example 6

By employing an equivalent amount of 2-(4-methoxyphenyl)-cyclopropanecarboxylic acid for 2-phenylcyclopropanecarboxylic acid in Example 1, there is prepared 6 - [2 - (4 - methoxyphenyl) - cyclopropanecarboxyamido]-penicillanic acid.

Similarly by employing 2-(3,4-dimethoxyphenyl)-cyclopropanecarboxylic acid as the starting material in Example 1, there is obtained, 6-[2-(3,4-dimethoxyphenyl)-cyclopropanecarboxyamido]-penicillanic acid.

Example 7

To 600 ml. of water and 100 ml. of sulfuric acid at −10° C. are added 79 g. of 2-(4-aminophenyl)-cyclopropanecarboxylic acid. The mixture is stirred and to it is slowly added 34 g. of sodium nitrite. Through 800 ml. of a saturated solution of copper sulfate is passed a stream of steam. The diazonium salt prepared above is carefully added and upon completion of the addition the resultant solution is cooled and extracted with ether. The ether extracts are washed with a small amount of water and dried over sodium sulfate. Concentration of the dried ethereal solution yields 2-(4-hydroxyphenyl)-carboxylic acid. Sixteen grams of this compound, 2-(4-hydroxyphenyl)-carboxylic acid are then subjected to the reaction procedure of Example 1 and there is thus obtained upon purification 6-[2-(4-hydroxyphenyl)-cyclopropanecarboxyamido]-penicillanic acid.

*Example 8*

4-bromostyrene (18.3 g.) and 20 g. of ethyl diazoacetate are carefully mixed at 0° C. The mixture is heated gradually to 150° C. and maintained at this temperature for 6 hours. The mixture is then distilled under reduced pressure and the main fraction consisting of ethyl 2-(4-bromophenyl)-cyclopropanecarboxylate is collected.

A mixture of 26.9 g. of ethyl 2-(4-bromophenyl)-cyclopropanecarboxylate, 20.0 g. of potassium hydroxide, 20 ml. of water and 90 ml. of 95% ethanol is heated at reflux temperature for four hours. The solvents are then removed in vacuo and the resultant solid residue is dissolved in water. This aqueous solution is then adjusted to pH 1 with concentrated hydrochloric acid and the precipitate which forms collected by filtration to yield trans 2 (4-bromophenyl)-cyclopropanecarboxylic acid.

The mother liquor from the above recrystallization is concentrated in vacuo to give the cis 2-(4-bromophenyl)-cyclopropanecarboxylic acid.

The above cis and trans forms of 2-(4-bromophenyl)-cyclopropanecarboxylic acid are separately subjected to the procedure of Example 1 to yield the corresponding cis and trans forms of 6-[2-(4-bromophenyl)-cyclopropanecarboxyamido]-penicillanic acid.

*Example 9*

4-trifluoromethylstyrene (30.0 g.) and 35.0 g. of ethyl diazoacetate are mixed at 0° C. and the mixture heated gradually to 150° C. The reaction temperature is maintained at this level for 3 hours and then the mixture is distilled under reduced pressure. The main fraction is collected which consists essentially of ethyl 2-(4-trifluoromethylphenyl)-cyclopropanecarboxylate. A solution of 11.5 g. of potassium hydroxide in 12 ml. of water and 50 ml. of 95% ethanol is added to 17.6 g. of ethyl 2-(4-trifluoromethylphenyl) - cyclopropanecarboxylate. The solution is heated at reflux temperatures for four hours and the products isolated as described in Example 8 to give after fractional recrystallization the separated cis and trans 2-(4-trifluoromethylphenyl)-cyclopropanecarboxylic acid.

Following the general procedure of Example 1 but employing the separate isomeric forms of the acids prepared in this example, there are prepared respectively the cis and trans forms of 6-[2-(4-trifluoromethylphenyl)-cyclopropanecarboxyamido]-penicillanic acid.

*Example 10*

One hundred and eighty grams of 2-(4-methoxyphenyl)-cyclopropanecarboxylic acid are placed in a 3-necked flask provided with a thermometer, a reflux condenser and a bubbler. To the flask is added 10.4 g. of phosphorus pentachloride and dry chlorine gas is then bubbled through the solution at 180° C. for approximately 6 hours. The resultant mixture is then distilled in vacuo and the major portion collected, consisting essentially of 2-(4-trichloromethoxyphenyl) - cyclopropanecarboxyl chloride. Treatment of this product with water then forms the corresponding acid, 2-(4-trichloromethoxyphenyl)-cyclopropanecarboxylic acid which is isolated by adjusting pH to 2.0 with hydrochloric acid and collecting the resultant solid by filtration. This compound is then subjected to the reaction procedures of Example 1 and there is obtained 6-[2-(4-trichloromethoxyphenyl)-cyclopropanecarboxyamido]-penicillanic acid.

*Example 11*

2 - (4 - trichloromethoxyphenyl)-cyclopropanecarboxyl chloride (16.1 g.) prepared in Example 10, and 10.7 g. of antimony trifluoride are placed in a Würtz flask and to the mixture is added 1.1 g. of antimony pentachloride. The mixture is heated to boiling and is held at the boiling point for several minutes. The resultant mixture is then distilled under reduced pressure. To distillate so collected is cautiously added 50 ml. of water and the resultant mixture stirred and then extracted with ether. The ethereal extracts are dried over sodium sulfate and the ether then removed by evaporation. The residue, consisting essentially of 2-(4-trifluoromethoxyphenyl)-cyclopropanecarboxylic acid, is then subjected to the reaction of the procedure of Example 1 and there is thus obtained 6-[2-(4-trifluoromethoxyphenyl)-cyclopropanecarboxyamido]-penicillanic acid.

*Example 12*

In the manner of Example 8, 4-t-butylstyrene is treated with ethyl diazoacetate and upon following the procedures therein described, there is obtained the cis and trans isomers of 2-(4-t-butylphenyl)-cyclopropanecarboxylic acid which, when treated in the manner described in Example 1, yields the cis and trans forms of 6-[2-(4-t-butylphenyl) - cyclopropanecarboxyamido] - penicillanic acid.

In a similar manner 2-methyl-5-isopropylstyrene is converted to 6-[2-(2-methyl-5-isopropylphenyl)-cyclopropanecarboxyamido]-penicillanic acid.

*Example 13*

An equivalent amount of 2,5-dichlorostyrene is employed in place of 4-trifluoromethylstyrene in the procedure of Example 9 and it is thus obtained upon purification in the prescribed manner the cis and trans forms of 6-[2-(2,5-dichlorophenyl)cyclopropanecarboxyamido]-penicillanic acid.

*Example 14*

A solution of 4.7 g. of trans-2-phenyl-cyclopropanecarboxyl chloride in 45 ml. of diacetone is added dropwise over a 10 minute period to a stirred solution of 4.32 g. of 6-amino penicillanic acid in 200 ml. of 3% sodium bicarbonate solution and 150 ml. of acetone. Upon completion of the addition, the mixture is stirred at room temperature for 30 minutes. The reaction mixture is then extracted 3 times with an equal volume of ether. To the aqueous phase is added 50 ml. of ether and the mixture cooled to 0–5° C. while the pH is adjusted to 2.0 by addition of concentrated hydrochloric acid. The ether layer is removed and the aqueous phase is then extracted with ether. The combined ether extracts are washed with water and dried over sodium sulfate at 0° C. The dried ethereal solution is then evaporated to a residue comprising the trans isomer of 6-(2-phenylcyclopropanecarboxyamido)-penicillanic acid.

The cis form of 2-phenylcyclopropanecarboxyl chloride may be employed to yield the cis isomer of 6-(2-phenylcyclopropanecarboxyamido)-penicillanic acid.

Likewise the various substituted 2-phenylcyclopropanecarboxylic acid may be converted to the corresponding acid chloride and reacted with 6-aminopenicillanic acid in the manner of this example.

*Example 15*

One gram of 6-[2-(4-chlorophenyl)-cyclopropanecarboxyamido]-penicillanic acid is dissolved in excess amyl acetate and titrated with dilute aqueous sodium hydroxide to pH 8. The solution is then reduced in volume and the crystals which form are collected by filtration to yield sodium 6-[2-(4-chlorophenyl)-cyclopropanecarboxyamido]-penicillanate.

*Example 16*

One gram of 6-(2-phenylcyclopropanecarboxyamido)-penicillanic acid is dissolved in excess amyl acetate and to the solution is added 10 g. of N-ethyl piperidine. The solution is stirred for 30 minutes and the crystals formed upon standing are collected by filtration to yield the N-ethyl piperidinium salt of 6-(2-phenylcyclopropanecarboxyamido)-penicillanic acid.

We claim:
1. Compounds having the structural formula:

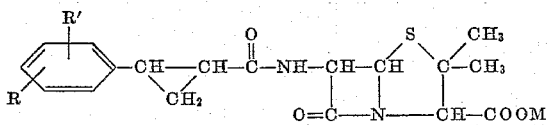

wherein M is a member of the group consisting of hydrogen and pharmaceutically acceptable cations, R and R' are members of the group consisting of hydrogen, halogen, lower alkyl, lower alkoxy, halogenated lower alkyl, halogenated lower alkoxy, hydroxy, nitro, and amino.

2. A compound according to claim 1 wherein R, R' and M represent hydrogen.

3. 6-[2-(4-chlorophenyl)-cyclopropanecarboxamido]-penicillanic acid.

4. 6-[2-(4-methylphenyl)-cyclopropanecarboxamido]-penicillanic acid.

5. 6-[2-(4-aminophenyl)-cyclopropanecarboxamido]-penicillanic acid.

6. 6-[2-(3,4-dimethoxyphenyl)-cyclopropanecarboxamido]-penicillanic acid.

7. 6-[2-(4-trifluoromethylphenyl)-cyclopropanecarboxamido]-penicillanic acid.

8. 6-[2-(2,5-dichlorophenyl)-cyclopropanecarboxamido]-penicillanic acid.

References Cited in the file of this patent
UNITED STATES PATENTS

| | | |
|---|---|---|
| 2,479,295 | Behrens et al. | Aug. 16, 1949 |
| 2,479,296 | Behrens et al. | Aug. 16, 1949 |
| 2,479,297 | Behrens et al. | Aug. 16, 1949 |
| 2,941,995 | Doyle | June 21, 1960 |
| 2,985,648 | Doyle et al. | May 23, 1961 |

FOREIGN PATENTS

| | | |
|---|---|---|
| 569,728 | Belgium | Nov. 15, 1958 |

OTHER REFERENCES

Evers et al.: The Chemistry of Drugs, pages 317–322, 3d ed. (1959).